US008668999B2

(12) United States Patent
Nunome et al.

(10) Patent No.: US 8,668,999 B2
(45) Date of Patent: Mar. 11, 2014

(54) LITHIUM PRIMARY BATTERY

(75) Inventors: Jun Nunome, Kyoto (JP); Fumio Kato, Osaka (JP); Kenichi Morigaki, Hyogo (JP); Shinichiro Tahara, Osaka (JP)

(73) Assignee: Panasonic Corporation, Osaka (JP)

( * ) Notice: Subject to any disclaimer, the term of this patent is extended or adjusted under 35 U.S.C. 154(b) by 308 days.

(21) Appl. No.: 13/143,602

(22) PCT Filed: Nov. 10, 2010

(86) PCT No.: PCT/JP2010/006609
§ 371 (c)(1),
(2), (4) Date: Jul. 7, 2011

(87) PCT Pub. No.: WO2011/058745
PCT Pub. Date: May 19, 2011

(65) Prior Publication Data
US 2011/0269003 A1 Nov. 3, 2011

(30) Foreign Application Priority Data
Nov. 16, 2009 (JP) ................. 2009-260717

(51) Int. Cl.
*H01M 6/10* (2006.01)
*H01M 4/00* (2006.01)
(52) U.S. Cl.
USPC .......................................................... 429/94
(58) Field of Classification Search
USPC .......................................................... 429/94
See application file for complete search history.

(56) References Cited

U.S. PATENT DOCUMENTS

| 2003/0228518 A1 | 12/2003 | Marple |
| 2010/0086833 A1* | 4/2010 | Pozin et al. .................. 429/50 |

FOREIGN PATENT DOCUMENTS

| GB | 2 160 705 A | 12/1985 | |
| JP | 61-008852 | 1/1986 | |
| JP | U 63-167671 | 11/1988 | |
| JP | 08-306352 | 11/1996 | |
| JP | 2002-343327 | 11/2002 | |
| JP | 2003-045495 | 2/2003 | |
| JP | 2003045495 A * | 2/2003 | ............ H01M 10/40 |
| JP | 2004-047242 | 2/2004 | |
| JP | 2005-529467 | 9/2005 | |
| JP | 2007-317415 | 12/2007 | |
| JP | 2008-041504 | 2/2008 | |

* cited by examiner

*Primary Examiner* — Karie Apicella
(74) *Attorney, Agent, or Firm* — McDermott Will & Emery LLP

(57) ABSTRACT

A lithium primary battery 10 includes an electrode group in which a positive electrode 1 having iron disulfide as a positive electrode active material and a negative electrode 2 having lithium as a negative electrode active material are wound, with a separator 3 interposed between the positive electrode 1 and the negative electrode, wherein a density of the iron disulfide in a positive electrode mixture containing the positive electrode active material is in a range of 2.2-2.9 g/cm$^3$, and the separator 3 is made of a non-woven fabric whose tensile strength is in a range of 6-30 N/mm$^2$.

2 Claims, 1 Drawing Sheet

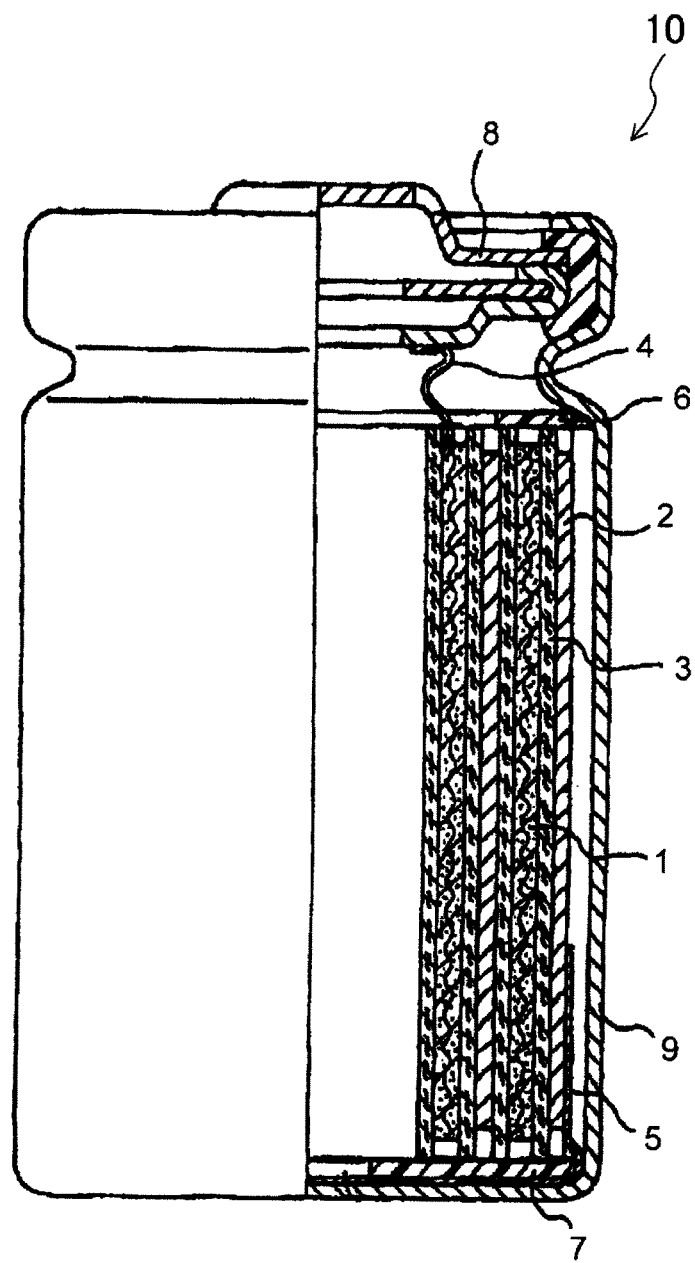

LITHIUM PRIMARY BATTERY

RELATED APPLICATIONS

This application is the U.S. National Phase under 35 U.S.C. §371 of International Application No. PCT/JP2010/006609, filed on Nov. 10, 2010, which in turn claims the benefit of Japanese Application No. 2009-260717, filed on Nov. 16, 2009, the disclosures of which Applications are incorporated by reference herein.

TECHNICAL FIELD

The present invention relates to lithium primary batteries using iron disulfide as a positive electrode active material.

BACKGROUND ART

Lithium primary batteries using iron disulfide as a positive electrode active material (hereinafter simply referred to as a "lithium primary battery") include a positive electrode material and a negative electrode material which have a very large theoretical capacity, i.e., iron disulfide in the positive electrode active material is about 894 mAh/g, and lithium in the negative electrode active material is about 3863 mAh/g. Thus, lithium primary batteries are very practical for a lightweight, high-capacity battery. Further, the initial open circuit voltage (OCV) of the lithium primary batteries is from 1.7 V to 1.8 V, and the average discharge voltage of the lithium primary batteries is about 1.5 V. Thus, the lithium primary batteries are very practical, also in terms of their compatibility with other 1.5 V-level primary batteries, such as a manganese battery or an alkaline manganese battery.

Cylindrical-shaped lithium primary batteries in practical use are configured such that an electrode group in which a positive electrode and a negative electrode are wound, with a separator interposed therebetween, is housed in a hollow cylindrical battery case. Thus, the area where the positive and negative electrodes face each other is larger than the other 1.5 V-level primary batteries. Therefore, the cylindrical-shaped lithium primary batteries have superior heavy-load discharge characteristics.

However, since the volume of the iron disulfide as a positive electrode active material increases as a result of a discharge reaction, the battery needs to include space for allowing for the volume expansion. For example, if there is no sufficient space in the battery, the separator may be compressed due to the volume expansion of the iron disulfide, and the electrolyte solution contained in the separator is squeezed out, resulting in depletion of the electrolyte solution between the positive and negative electrodes, or movement of ions may be restricted due to significant reduction of the space in the positive electrode mixture, and as a result, discharge polarization increases and it is not possible to exhibit superior discharge characteristics.

In view of the problems, Patent Document 1 discloses a technique in which an electrolyte layer is provided between the separator and an electrode to allow for the volume expansion of the iron disulfide, thereby preventing an increase in internal resistance.

However, it is practically difficult to provide such an electrolyte layer between the separator and an electrode in a cylindrical-shaped lithium primary battery in which a wound electrode group is housed.

Further, Patent Document 2 discloses a technique in which the volume expansion of the iron disulfide is reduced by making the capacity of the positive electrode larger than the capacity of the negative electrode.

CITATION LIST

Patent Document

Patent Document 1: Japanese Patent Publication No. S61-8852
Patent Document 2: Japanese Patent Publication No. 2005-529467

SUMMARY OF THE INVENTION

Technical Problem

The cylindrical-shaped lithium primary batteries in which a wound electrode group is housed is superior in heavy-load discharge characteristics. To be superior to alkaline batteries, etc., also in light-load discharge characteristics or intermediate-load discharge characteristics, a density of the positive electrode active material needs to be increased.

However, if the density of the positive electrode active material is increased, the problems described below may occur.

Table 1 shows the results of measurements of the discharge capacity at light-load discharge and the discharge capacity at heavy-load discharge when the density of the positive electrode active material (iron disulfide) was increased. As shown in Table 1, at light-load discharge, the discharge capacity of the battery A2 whose positive electrode active material has a higher density is larger than the discharge capacity of the battery A1 whose positive electrode active material has a smaller density. On the contrary, at heavy-load discharge, the discharge capacity of the battery A2 is smaller than the discharge capacity of the battery A1.

TABLE 1

| | Density of Active Material (g/cm³) | Separator | Discharge Capacity at Light-Load Discharge (mAh) | Discharge Capacity at Heavy-Load Discharge (mAh) |
|---|---|---|---|---|
| Battery A1 | 2.1 | polyethylene porous film | 3200 | 2221 |
| Battery A2 | 2.6 | polyethylene porous film | 3500 | 2065 |

This is because if the density of the positive electrode active material is increased, the volume expansion of the positive electrode active material at a discharge becomes more significant, and thus, the wound electrode group is compressed and space in the positive electrode mixture layer is reduced. As a result, movement of the ions (an electrolyte solution) is restricted and polarization at the end stage of the discharge increases, and therefore, the discharge capacity at heavy-load discharge is not sufficiently increased.

It is an objective of the present invention to provide a large capacity lithium primary battery whose heavy-load discharge characteristics are not reduced even if a density of a positive electrode active material is increased.

Solution to the Problem

A lithium primary battery according to one aspect of the present invention includes an electrode group in which a positive electrode having iron disulfide as a positive electrode active material and a negative electrode having lithium as a negative electrode active material are wound, with a separator interposed between the positive electrode and the negative electrode, wherein a density of the iron disulfide in a positive electrode mixture containing the positive electrode active material is in a range of 2.2-2.9 g/cm$^3$, and the separator is made of a non-woven fabric whose tensile strength is in a range of 6-30 N/mm$^2$.

Advantages of the Invention

According to the present invention, it is possible to provide a large capacity lithium primary battery having superior heavy-load discharge characteristics.

BRIEF DESCRIPTION OF THE DRAWINGS

FIG. 1 is a half cross-sectional view which schematically shows a structure of a lithium primary battery according to one embodiment of the present invention.

DESCRIPTION OF EMBODIMENTS

As described above, the heavy-load discharge characteristics are considered to be reduced when the density of the positive electrode active material (iron disulfide) is increased, because the volume expansion of the positive electrode active material at a discharge becomes more significant, and thus, the wound electrode group is compressed and space in the positive electrode mixture layer is reduced, and as a result, movement of the ions (electrolyte solution) is restricted and polarization at the end stage of the discharge increases.

Thus, the inventors of the present application considered that if it was possible to reduce the compression of the wound electrode group due to the volume expansion of the positive electrode active material, it would be possible to reduce a reduction in space in the positive electrode mixture layer, and as a result, that it would be possible to reduce a reduction in heavy-load discharge characteristics even if the density of the positive electrode active material was increased.

The inventors of the present application further examined the cause of the compression of the wound electrode group, and came to focus on the tensile strength of the separator. That is, if the tensile strength of the separator is great, it means that the separator strongly presses the wound electrode group when the volume of the positive electrode active material is expanded, and as a result, space in the positive electrode mixture layer is further reduced.

As a material for the separator of a lithium primary battery using iron disulfide as a positive electrode active material, a material whose tensile strength is relatively great, such as a polyethylene porous film, had been used for the reason that a thin layer can be easily formed, that relatively uniform pores can be obtained, and that the material is chemically stable.

Thus, the inventors of the present application prepared wound electrode groups using separators having different tensile strengths, and fabricated lithium primary batteries having these electrode groups to measure heavy-load discharge characteristics of the respective lithium primary batteries, and checked the effects of the tensile strength on the heavy-load discharge characteristics.

FIG. 1 is a half cross-sectional view showing a structure of the obtained lithium primary battery 10. An electrode group obtained by winding a positive electrode 1 and a negative electrode 2, with a separator 3 interposed therebetween, is housed in a battery case 9 together with a nonaqueous electrolyte solution (not shown). The opening of the battery case 9 is sealed with a sealing plate 8 connected to a core member of the positive electrode 1 via a positive electrode lead 4. Further, the negative electrode 2 is connected to the battery case 9 via a negative electrode lead 5. Insulating plates 6, 7 are provided at an upper portion and a lower portion of the electrode group to prevent internal short circuit.

As the positive electrode 1, a positive electrode current collector (aluminum expanded metal) having a thickness of 35 μm was filled with a positive electrode mixture of iron disulfide, a conductive agent (ketjen black), and a binder (polytetrafluoroethylene (PTFE)) mixed in a ratio of 94.0:3.5:2.5 [% by mass], and was dried. After that, the positive electrode current collector was rolled so that the density of the active material in the positive electrode mixture be 2.6 g/cm$^3$, thereby fabricating a positive electrode plate having a width of 44 mm, an electrode plate length of 165 mm, and a thickness of 0.276 mm.

The density of the active material in the positive electrode mixture can be obtained by the following method. The dried positive electrode plate is cut into a unit area (e.g., 3 cm squared) to measure the thickness by a thickness gauge, and measure the mass. Separately, a mass and a volume of the current collector per unit area are obtained, and the volume and the mass of the current collector are subtracted from the measured volume and mass of the positive electrode plate to calculate the density of the mixture. The density of the active material is calculated from a mass ratio of a solid matter mixed in the mixture (in the above case, a ratio of the active material in the mixture is 94.0% by mass).

The obtained positive electrode 1 and the negative electrode 2 made of metallic lithium were wound, with the separator 3 interposed therebetween, thereby fabricating an electrode group whose outer diameter is 13 mm. This electrode group was housed in the cylindrical-shaped battery case 9 together with a nonaqueous electrolyte solution having lithium iodide as an electrolyte, thereby fabricating an AA lithium primary battery 10. A metallic lithium foil having a thickness which makes a theoretical capacity ratio of a positive electrode to a negative electrode per unit area between electrode plates opposed to each other (i.e., a negative electrode's theoretical capacity/a positive electrode's theoretical capacity) 0.80 was used. The theoretical capacity of the iron disulfide as a positive electrode active material was set to 894 mAh/g.

Here, as the separator 3, a conventional polyethylene porous film (tensile strength: 120 N/mm$^2$) and a non-woven fabric (tensile strength: 3-30 N/mm$^2$) in which cellulose fibers whose tensile strength is lower than the tensile strength of the conventional polyethylene porous film are randomly entangled, were used.

Conventional polyethylene porous films are a homogeneous membrane of polyethylene with fine pores. Thus, unlike the non-woven fabric, no slippage of fibers occurs, or no structural change between fibers, such as extension of cloth, occurs. For this reason, the tensile strength of the polyethylene porous film relies mostly on the physical strength intrinsic to the polyethylene as a material. Thus, it is difficult to form the separator 3 whose tensile strength is 80 N/mm$^2$ or less.

On the other hand, the non-woven fabric formed by entangling cellulose fibers or polyethylene fibers can be extended all over the non-woven fabric, not only due to extension of the cellulose and polyethylene as the materials forming the fibers, but also due to application of tensile stress by slippage of entangled fibers or a structural change between fibers. Thus, the separator 3 whose tensile strength is in a range of 3-30

N/mm² can be easily formed by adjusting the length and thickness of the fibers, and how these fibers are entangled.

Further, the tensile strength is in conformity with Japanese Industrial Standards (JIS) No. L1085, "Tensile strength and elongation" in "Testing methods for nonwoven interlining fabrics" and was measured with a length between grips of 100 mm and at a pulling speed of 300 mm per minute.

Light-load discharge characteristics and heavy-load discharge characteristics of each of the obtained batteries were measured according to the following steps. Five batteries of each type of the batteries were measured for both of the characteristics, and the average was calculated. The open circuit voltage of a lithium primary battery right after assembly is higher than an actual voltage due to an effect of remaining active species, such as oxygen, absorbed in the conductive agent in the positive electrode. Thus, the batteries were pre-discharged at a constant current of 200 mA for 30 minutes (100 mAh). Further, aging was conducted in an atmosphere of 40° C. for two days.

(1) Light-Load Discharge Characteristics (Discharge Capacity at Light-Load Discharge)

Each of the obtained batteries was discharged at a constant current of 100 mA in an atmosphere of 20° C., and a discharge capacity (mAh) was measured until the open circuit voltage reached 0.9 V.

(2) Heavy-Load Discharge Characteristics (Discharge Capacity at Heavy-Load Discharge)

The step in which each of the obtained batteries is discharged at 1.5 W for two seconds in an atmosphere of 21° C., and is then discharged at 0.65 W for 28 seconds (i.e., pulse discharge) is regarded as one cycle. Ten cycles of the pulse discharge per hour were conducted, and a discharge capacity (mAh) was measured until the open circuit voltage reached 1.05 V. This measurement uses a method of a discharge test specified in standards C18.1M of American National Standards Institute (ANSI), and was intended for use in a digital still camera.

Table 2 shows the results of measurements of the above two characteristics of the batteries B1-B8 having separators of different tensile strengths.

batteries B2-B7 having separators of the tensile strength of 6-30 N/mm² This may be because the compression applied to the electrode group when the volume of the positive electrode active material was expanded, was reduced by the separator having a lower tensile strength, and therefore, a reduction of space in the positive electrode mixture layer was reduced.

Further, in the battery whose separator had a tensile strength of 3 N/mm² or lower (battery B8), the separator was broken when the positive electrode and the negative electrode were wound, with the separator interposed therebetween. Thus, an electrode group could not be formed.

Further, the discharge capacity of the battery B1 at light-load discharge is larger than the discharge capacities of the batteries B2-B7 at light-load discharge because of the following reason. That is, since the separator made of a polyethylene porous film was formed to have a thickness of 25 μm, and the separator made of a non-woven fabric was formed to have a thickness of 35 μm in order to provide same penetrability and same interception of ions as separators, the length of the positive electrode plate and the length of the negative electrode plate of the battery B1 having a separator made of a polyethylene porous film were longer than those of the batteries B2-B7 having a separator made of a non-woven fabric, in the case where electrode groups having the same outer diameter were formed.

Next, to further validate the effect in which a reduction in space in the positive electrode mixture layer was reduced by decreasing a tensile strength of the separator, lithium primary batteries whose separators had the same tensile strength (15 N/mm²) were fabricated using the positive electrode mixtures having different densities of the active material. The discharge capacity at light-load discharge, and the discharge capacity at heavy-load discharge were measured for each of the lithium primary batteries. The same method as the method used in Table 2 was used to measure each of the characteristics.

Table 3 shows the results of measurements of the batteries C1-C7 in which the density of the active material in the positive electrode mixture was changed in a range of 2.1-3.0 g/cm³.

TABLE 2

| | Density of Active Material (g/cm³) | Separator | Tensile Strength of Separator (N/mm²) | Discharge Capacity at Light-Load Discharge (mAh) | Discharge Capacity at Heavy-Load Discharge (mAh) |
| --- | --- | --- | --- | --- | --- |
| Battery B1 | 2.6 | polyethylene porous film | 120 | 3500 | 2065 |
| Battery B2 | 2.6 | non-woven fabric | 30 | 3374 | 2319 |
| Battery B3 | 2.6 | non-woven fabric | 25 | 3374 | 2429 |
| Battery B4 | 2.6 | non-woven fabric | 18 | 3374 | 2531 |
| Battery B5 | 2.6 | non-woven fabric | 15 | 3374 | 2581 |
| Battery B6 | 2.6 | non-woven fabric | 9 | 3374 | 2564 |
| Battery B7 | 2.6 | non-woven fabric | 6 | 3374 | 2564 |
| Battery B8 | 2.6 | non-woven fabric | 3 | — | — |

As shown in Table 2, the discharge capacity at heavy-load discharge is reduced in the battery B1 having a separator of a tensile strength of 120 N/mm², whereas a reduction in the discharge capacity at heavy-load discharge is reduced in the

TABLE 3

| | Density of Active Material (g/cm³) | Separator | Tensile Strength of Separator (N/mm²) | Discharge Capacity at Light-Load Discharge (mAh) | Discharge Capacity at Heavy-Load Discharge (mAh) |
| --- | --- | --- | --- | --- | --- |
| Battery C1 | 2.1 | non-woven fabric | 15 | 3150 | 2268 |
| Battery C2 | 2.2 | non-woven fabric | 15 | 3235 | 2475 |
| Battery C3 | 2.4 | non-woven fabric | 15 | 3304 | 2528 |
| Battery C4 | 2.6 | non-woven fabric | 15 | 3374 | 2581 |
| Battery C5 | 2.7 | non-woven fabric | 15 | 3409 | 2608 |
| Battery C6 | 2.9 | non-woven fabric | 15 | 3500 | 2678 |
| Battery C7 | 3.0 | non-woven fabric | 15 | 3513 | 2354 |

As shown in Table 3, a reduction in discharge capacity at heavy-load discharge was reduced in the batteries C2-C6 in which the density of the active material in the positive electrode mixture was in a range of 2.2-2.9 g/cm³, and the effect in which a reduction in space in the positive electrode mixture layer was reduced by decreasing the tensile strength of the separator was validated. The reason why the discharge capacity at heavy-load discharge was small in the battery C1 in which the density of the active material in the positive electrode mixture was 2.1 g/cm$^3$ may be that the density of the active material was so small that sufficient heavy-load discharge characteristics could not be obtained. Further, the reason why the discharge capacity at heavy-load discharge was small in the battery C7 in which the density of the active material in the positive electrode mixture was 3.1 g/cm$^3$ may be that the density of the active material was so high that the volume of the positive electrode active material expanded significantly, and thus, the separator could not sufficiently reduce the compression of the electrode group.

Next, lithium primary batteries in which the densities of the active materials in the respective positive electrode mixtures are the same (2.9 g/cm$^3$) were fabricated using separators having different tensile strengths. The discharge capacity at light-load discharge, and the discharge capacity at heavy-load discharge were measured for each of the lithium primary batteries. The same method as the method used in Table 2 was used to measure each of the characteristics.

Table 4 shows the results of measurements of the batteries D1-D3 in which the tensile strength of the separator was changed in a range of 6-18 N/mm$^2$.

TABLE 4

| | Density of Active Material (g/cm$^3$) | Separator | Tensile Strength of Separator (N/mm$^2$) | Discharge Capacity at Light-Load Discharge (mAh) | Discharge Capacity at Heavy-Load Discharge (mAh) |
|---|---|---|---|---|---|
| Battery D1 | 2.9 | non-woven fabric | 6 | 3502 | 2601 |
| Battery D2 | 2.9 | non-woven fabric | 15 | 3500 | 2678 |
| Battery D3 | 2.9 | non-woven fabric | 18 | 3501 | 2583 |

As shown in Table 4, a reduction in discharge capacity at heavy-load discharge was reduced in the batteries D1-D3 in which the tensile strength of the separator is in a range of 6-18 N/mm$^2$, even in the case where the density of the active material in the positive electrode mixture was high (i.e., 2.9 g/cm$^3$).

In view of the results described above, a lithium primary battery having an electrode group obtained by winding a positive electrode having iron disulfide as a positive electrode active material and a negative electrode having lithium as a negative electrode active material, with a separator interposed therebetween, can be a large capacity lithium primary battery whose heavy-load discharge characteristics are not reduced even if a density of the positive electrode active material is increased, by using the separator made of a non-woven fabric having a tensile strength in a range of 6-30 N/mm$^2$ in the case where the density of the iron disulfide in the positive electrode mixture containing the positive electrode active material is in a range of 2.2-2.9 g/cm$^3$.

According to the present invention, materials for the separator are not specifically limited as long as the separator has the above predetermined tensile strength. For example, in addition to the cellulose fiber, vinylon, rayon, nylon, polyethylene, or polypropylene fibers may be entangled, or a cloth-like non-woven fabric bonded by a chemical or thermal technique may be used.

Further, if the tensile strength of the non-woven fabric forming the separator is not isotropic, the term "tensile strength" as used in the present invention means a tensile strength in a winding direction of the separator.

Further, according to the present invention, materials for the positive electrode current collector are not specifically limited. For example, in addition to the aluminum expanded metal, porous metallic materials such as punched metal, foamed metal, and spongy metal can be used. Alternately, metal foils such as an aluminum foil, a nickel foil, and a stainless foil may also be used. In this case, the positive electrode mixture is coated on a surface of the positive electrode current collector made of a metal foil.

Further, according to the present invention, in addition to the metallic lithium, the negative electrode may be made of a lithium alloy such as Li—Al. The solvent to be used for the electrolyte solution is not specifically limited as long as the solvent is an organic solvent. For example, γ-butyrolactone, propylene carbonate, ethylene carbonate, etc. may be used. Examples of the electrolyte forming the electrolyte solution include, in addition to lithium iodide, lithium perchlorate, lithium fluoroborate, lithium phosphate hexafluoride, and lithium trifluoromethanesulfonate, etc.

The present invention has been described with reference to the preferable embodiments, but the above description does not limit the present invention, and of course, various modifications can be made. For example, in the above embodiments, cylindrical AA batteries were used as examples. However, the batteries are not limited to the cylindrical AA batteries, but cylindrical batteries in different sizes rectangular batteries, button batteries, coin batteries, etc., may also be used.

INDUSTRIAL APPLICABILITY

The present invention is useful as a 1.5 V-level primary battery used for a digital still camera, etc.

DESCRIPTION OF REFERENCE CHARACTERS 1 positive electrode
2 negative electrode
3 separator
4 positive electrode lead
5 negative electrode lead
6, 7 insulating plate
8 sealing plate
9 battery case
10 lithium primary battery

The invention claimed is:
1. A lithium primary battery, comprising:
an electrode group in which a positive electrode having iron disulfide as a positive electrode active material and a negative electrode having lithium as a negative electrode active material are wound, with a separator interposed between the positive electrode and the negative electrode, wherein
a density of the iron disulfide in a positive electrode mixture containing the positive electrode active material is in a range of 2.2-2.9 g/cm$^3$, and
the separator is made of a non-woven fabric whose tensile strength is in a range of 6-30 N/mm$^2$.
2. The lithium primary battery of claim 1, wherein
the separator is made of a non-woven fabric in which cellulose fibers are randomly entangled.

* * * * *